(12) United States Patent
Edge (10) Patent No.: US 8,824,005 B2
(45) Date of Patent: Sep. 2, 2014

(54) METHOD OF DESIGNING A COLOR CHART

(75) Inventor: Christopher J. Edge, St. Paul, MN (US)

(73) Assignee: Eastman Kodak Company, Rochester, NY (US)

( * ) Notice: Subject to any disclaimer, the term of this patent is extended or adjusted under 35 U.S.C. 154(b) by 438 days.

(21) Appl. No.: 13/165,160

(22) Filed: Jun. 21, 2011

(65) Prior Publication Data

US 2012/0327433 A1    Dec. 27, 2012

(51) Int. Cl.
*G01C 11/12* (2006.01)
*G01J 3/46* (2006.01)
*G01N 33/28* (2006.01)
*H04N 1/40* (2006.01)
*G06F 3/12* (2006.01)

(52) U.S. Cl.
USPC .............. 358/1.9; 356/402; 356/404; 356/73; 358/3.06; 358/518; 358/3.16; 358/504; 358/3.13; 358/3.1

(58) Field of Classification Search
USPC .......... 358/504, 518, 1.9, 404, 3.06; 356/402, 356/464, 73
See application file for complete search history.

(56) References Cited

U.S. PATENT DOCUMENTS

| | | | |
|---|---|---|---|
| 6,232,954 B1* | 5/2001 | Rozzi | 345/601 |
| 6,717,672 B2* | 4/2004 | Tamagawa | 356/402 |
| 7,136,188 B2* | 11/2006 | Kondo | 358/1.9 |
| 7,710,597 B2 | 5/2010 | Edge | |
| 7,738,142 B2 | 6/2010 | Edge | |
| 7,773,256 B2 | 8/2010 | Edge | |
| 8,102,566 B2* | 1/2012 | Hatori | 358/1.9 |
| 8,274,706 B2* | 9/2012 | Monga et al. | 358/3.06 |

* cited by examiner

*Primary Examiner* — Akwasi M Sarpong
(74) *Attorney, Agent, or Firm* — Nelson Adrian Blish (57) ABSTRACT

A method of characterizing an imaging system is described includes printing a color chart having a plurality of predetermined color patches; measuring the color patches to obtain colorimetric data; initializing a Neugebauer model with the Neugebauer solids of said colorimetric data; optimizing the global parameters of the Neugebauer model; optimizing the parameters associated with Demichel terms based on the Neugebauer primary associated with the Demichel term; optimizing parameters that vary with device coordinates; and creating a characterization file for the imaging system.

7 Claims, 4 Drawing Sheets

METHOD OF DESIGNING A COLOR CHART

Reference is made to commonly-assigned U.S. patent application Ser. No. 13/165,137 (now U.S. Publication No. 2012/0327477), filed Jun. 21, 2011, entitled A METHOD OF CHARACTERIZING AN IMAGING SYSTEM, by Edge; the disclosure of which is incorporated herein.

FIELD OF THE INVENTION

The present invention relates generally to the practice of color reproduction for a printing system and more particularly, designing a color chart for a printing system.

BACKGROUND OF THE INVENTION

CMYK (cyan, magenta, yellow, black) profiling of prepress proofing systems and output devices such as inkjet is fairly commonly practiced in many International Color Consortium (ICC) profiling solutions. Far more challenging is the profiling of N-color systems, printing presses, and particularly flexo printing presses due to inconsistency and variability of color measurements across the sheet, sheet-to-sheet, and run-to-run. N-color profiling of such systems is made even more complicated by the ever increasing size of color data sets required in order to build a profile with increasing N.

Both press variability and N-color profiling require many hours of manual labor to perform measurements, sort out bad data, and obtain average sets of measurements that are reliable for purposes of profiling. There is also a high cost to printing large charts due to the cost of plates, ink, paper, and manual labor. It is highly desirable therefore to develop better methods of profiling that have the potential of greatly reducing the amount of measurements required.

Physical modeling of output systems using Neugebauer, Kubelka-Munk, etc. has been shown useful in various applications (U.S. Pat. No. 6,232,954 (Rozzi); U.S. Pat. No. 7,710,597 (Edge); and U.S. Pat. No. 7,738,142 (Edge)). Since such models can define a system based on its fundamental properties such as ink density, spectral reflectance, dot gain, ink opacity, etc. there is the possibility of reducing the amount of data required in order to build a profile as well as the possibility of updating an existing profile based on changes in density, dot gain, etc.

Prior art models that attempt to solve this problem include Cellular Neugebauer (CN) and "NeugX." The former is a mature technology that currently provides optimal results given a reasonably well-sampled data set. NeugX is based on a hybrid physical model combining Neugebauer and Kubelka-Munk. As such, the latter model can be updated based on minimal information, such as changes in the density or hue of the primary inks, and tone properties. Both models require processing large amounts of data. The "revised NeugX" model described herein adds the ability to adjust the spectral Yule-Nielson n-factor as a function of device coordinates in order to characterize imaging systems whose behavior deviates significantly from a simple Neugebauer model.

Building profiles based on smaller amounts of chart data is of great value due to the high cost of printing sheets dedicated to images of measurement charts.

SUMMARY OF THE INVENTION

Briefly, according to one aspect of the present invention, a method of characterizing an imaging system is described includes printing a color chart having a plurality of predetermined color patches; measuring the color patches to obtain colorimetric data; initializing a Neugebauer model with the Neugebauer solids of said colorimetric data; optimizing the global parameters of the Neugebauer model; optimizing the parameters associated with Demichel terms based on the Neugebauer primary associated with the Demichel term; optimizing parameters that vary with device coordinates; and creating a characterization file for the imaging system.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Examples of the modified Neugebauer model (NeugX) are described in U.S. Pat. Nos. 7,773,256 and 7,710,597 (both to Edge). These examples are able to obtain good agreement between measured data and the mathematical model using spectral data that has already been converted to XYZ or using a "simplified spectral" RGB approach as opposed to performing full spectral calculations in the model. Although the full spectral approach works well with NeugX, the simplified spectral approach using RGB (i.e. treating RGB as a spectrum of sample size 3) is advantageous for increasing the speed of performing parameter optimization. The "NeugX" equation can be written as follows:

$$R_j(\vec{x})_{Total} = \sum_{\substack{p=1 \\ incr=2}}^{p=N_p-1} R_j(N_s, p) D\left(\vec{g}\left(\vec{x}, \vec{\Delta}_p, \vec{b}\right), p, N_s\right) \quad \text{Eq. 1}$$

where $\vec{x} = (x_1, x_2, x_3, \ldots, x_{N_s})$ and $$D(\vec{x}, p, N_s) = \prod_{s=1}^{s=N_s} f(x_s, s, p) \quad \text{Eq. 2}$$

$$f(x, s, p) = x \text{ if } ((p >> s) \& 0 \times 1 == 0 \times 1) \quad \text{Eq. 3}$$
$$f(x, s, p) = 1 - x \text{ if } ((p >> s) \& 0 \times 1 == 0 \times 0)$$

and the vector function g( ) can be defined in terms of its correction for each input device coordinate $x_s$:

$$g_s(x_s, \Delta_{sp}, \beta_s) = x'_s + 4\Delta_{sp} x'_s (1 - x'_s) \quad \text{Eq. 4}$$

where $x'_s = \beta_s + (1 - \beta_s) x_s$ for $x_s \geq x_{md}$ $x'_x = 0$ for $x_s < x_{md}$ \quad Eq. 5

The D( ) function above is the Demichel term used by Neugebauer in the original Neugebauer equation. The vector function g( ) (which will be explained in detail below) corrects the device coordinates x for dot gain and min dot bump (in the case of flexo printing).

As described in U.S. Pat. No. 7,773,256, if the spectrum sample size for index j is similar to that of the measurement device, i.e. 32 channels or more, the calculated values of $R_j$ are converted to XYZ using discrete integration of the human observer functions over the channels of wavelength j. If the simplified spectral approach using RGB is used, RGB can converted to XYZ via matrix conversion. The matrix used to convert between RGB and XYZ may be optimized based on the solid and overprint measurement data, or a generic matrix can be used that contains an acceptably large gamut of colorants and their combinations of overprints (known as Neugebauer primaries).

Note that XYZ values predicted from equation 1 can be further converted into a more visually uniform color space such as L*a*b* or CIECAM98s using well-known equations for these metrics.

In the expression above, referenced from U.S. Pat. No. 7,773,256, it is assumed for simplicity that there is no dependence on dot size or dot gain for the calculation of $R_j(N_s,p)$ in the summation, which refers to the spectral reflectance of the Neugebauer primary indicated by p. The index j refers to a channel in the discrete spectra being predicted for the imaging system. The simplest form of spectral prediction is RGB which may be regarded as a discrete spectrum of sample size 3. The vector x refers to the device coordinates, typically of dimensionality 4 for CMYK and higher when spot colors are printed in conjunction with CMYK colorants.

The index p in the equation above indicates the Neugebauer primary that pertains to the specific term in the Neugebauer sum. The p index indicates bits that are on or off, each bit representing either paper or a colorant being present. Since p varies from 0x1 to $N_p-1$ (where $N_p$=0x1<<Num_Colorants+Paper is the number of Neugebauer primaries×2), paper is always assumed to be "on," i.e. is always present or enabled. Thus, p=0x1=00001 is paper, p=0x2=00011 is cyan, p=0xB=10011 is black+cyan, etc.

$N_s$ in the expression above is the number of ink separations (separations other than paper). The index s indicates colorant or separation number, ranging from 1 to $N_s$. The vector function $g(x,\Delta_p,\beta)$ describes the dot gain adjustment for each device coordinate $x_s$ in vector x using dot gain value $\Delta_{sp}$ in vector $\Delta_p$ and min dot bump value $\beta_s$ in vector $\beta$. Thus, dot gain parameter $\Delta_{sp}$ indicates the dot gain associated with a particular colorant s when printing on Neugebauer primary indicated by p. Parameter vector $\Delta_p$ is the list of dot gains associated with each device coordinate $x_s$ when printing on the Neugebauer primary indicated by p. The parameter $\beta_s$ in vector $\beta$. Indicates the sudden onset of dot size that occurs in flexo printing, where typically there are no visible dots below a minimum dot threshold $x_{md}$. For input coordinate values greater than $x_{md}$, the first visible dot is typically quite apparent, and requires a "min dot bump" value indicated by $\beta_s$.

It is helpful to consider the parameter vector for dot gain $\Delta_p$ as being comprised of a global dot gain parameter vector $\Delta$ (which indicates the overall dot gain characteristic of each colorant indicated by s which is an index into $\Delta$) corrected by parameter vector $\delta_p$, which are the corrections to the baseline dot gain required as dots of colorant s print on Neugebauer solid p:

$$\vec{\Delta}_p = \vec{\Delta} + \vec{\delta}_p \qquad \text{Eq. 6}$$

This allows the optimization process to be separated into a global dot gain optimization followed optionally by dot gain corrections associated with individual terms in the Neugebauer summation.

The expression above combines features of U.S. Pat. No. 7,773,256 with features of U.S. Pat. No. 7,710,597. The latter invention introduced the concept of a dot gain parameter that changes value when printing on a Neugebauer primary as opposed to printing on paper. This dependency is indicated by the index p in the dot gain parameter $\Delta_{sp}$ above.

As a further improvement to the above model, a spline correction can be added to address non-linear behaviors inherent in various forms of printing such as flexo, ink jet, etc. The g( ) function therefore is further modified to be:

$$\vec{g}(\vec{x}, \vec{\Delta}_p, \vec{\beta}, \vec{k}_{in}, \vec{K}) \qquad \text{Eq. 7}$$

where $$\vec{K} = (\vec{k}_1, \vec{k}_2, \ldots, \vec{k}_{Ns}) \qquad \text{Eq. 8}$$

and the individual elements of the vector function g( ) are:

$$g_s(x_s, \Delta_{sp}, \beta_s, \vec{k}_{in}, \vec{k}_s) = S(4\Delta_{sp}x'_s(1-x'_s), \vec{k}_{in}, \vec{k}_s) \qquad \text{Eq. 9}$$

or alternatively $$g_s(x_s, \Delta_{sp}, \beta_s, \vec{k}_{in}, \vec{k}_s) = 4\Delta_{sp}S(x'_s, \vec{k}_{in}, \vec{k}_s)(1 - S(x'_s, \vec{k}_{in}, \vec{k}_s)) \qquad \text{Eq. 10}$$

where $x'_s = 0$ for $x_s < x_{md}$ $x'_s = \beta + (1-\beta_s)x_s$ for $x_s \geq x_{md}$ \qquad Eq. 11

The function $S(x_s, \vec{k}_{in}, \vec{k}_s)$ is a spline defined by input control points indicated by vector $\vec{k}_{in}$ and output values $\vec{k}_s$ for the colorant denoted by s. When the model is first initialized, $\vec{k}_s = \vec{k}_{in}$ resulting in no modification to input colorant value $x_s$.

Next, the model can be further modified to use the spectral Yule-Nielson correction n:

$$R_j(\vec{x})_{Total} = \left[ \sum_{\substack{p=1 \\ incr=2}}^{p=N_p-1} [R_j(N_s, p)]^{1/n_j} D\left(\vec{g}\left(\vec{x}, \vec{\Delta}_p, \vec{\beta}, \vec{k}_{in}, \vec{K}\right), N_s\right) \right]^{n_j} \qquad \text{Eq. 12}$$

where the index j in $n_j$ indicates that the n-factor varies with wavelength or (equivalently) with spectral channel j.

At this point in the discussion, it is helpful to categorize the types of parameters that can be optimized. The control points of the spline $S(x_s, \vec{k}_{in}, \vec{k}_s)$, the min dot bump $\beta_s$, the global dot gain $\Delta_s$, and the spectral n-factor $n_j$ are parameters that pertain to colorant s for all values $x_s$ regardless of other colorant values or Neugebauer primaries upon which colorant s is printed. Hence, they are global parameters which remain unchanged for all values of device coordinates and Neugebauer primaries upon which they print. Global parameters are the first category of parameters and generally are the first set of parameters to be optimized.

The corrections applied to the dot gains when printing on a Neugebauer primary indicated by p (parameter vector $\delta_p$) are unique for each term in the Neugebauer summation. Each of these terms is associated with a Neugebauer primary denoted by p. Thus, parameters of this type can be called "correction parameters associated with Neugebauer primaries." This second category of parameters should preferably be optimized after an optimization of global corrections is first performed.

A third category of correction parameters is now considered: these are correction parameters that vary with device coordinates. Corrections to the global spectral n-factor describe above is considered.

It is well-known that n-factor can vary with wavelength and with surface properties, which in turn can be affected by the presence of previously printed inks. In order to capture this variation in n-factor due the presence of other inks, n can be modified as follows:

$$n'_j = n_j + \frac{\sum_{\substack{s=1 \\ p=1, incr2}}^{\substack{s=N_s \\ p=N_p}} \Delta n_{jsp} w(x_s) D(\vec{x}, p, N_s)}{\sum_{s=1}^{s=N_s} w(x_s)} \qquad \text{Eq. 13}$$

where the function w( ) is a weighting function defined as:

$$w(x_s) = x_s(1-x_s) + \epsilon \qquad \text{Eq. 14}$$

In the above expression, $\Delta n_{jsp}$ is the correction to the n-factor for channel separation s printing on Neugebauer primary p for the spectral channel j (R, G, or B in the case of 3 spectral channels). The separation s can vary from 1 to $N_s$ (the number of channels or separations) and Neugebauer primary p can vary from 1 to $N_p$ (the number of Neugebauer primaries).

The weighting factors for $\Delta n_{jsp}$ are based on the value of the colorant s and the area of the Neugebauer primary p on which s is printed. The weighting factor for tint area for separation s is given by $w(x_s)$ which has a maximum at 50%. This because n-factor is only relevant for tints and has no impact for $x_s=0$ or 100%. The weighting factor for the Neugebauer primary p upon which s is printing is proportional to the area of the Neugebauer primary p which is calculated from the Demichel factor $D(x,p,N_s)$. The weighting factors $w(x_s)$ are normalized by the sum $w(x_s)$ in the denominator, and the tiny constant $\epsilon=0.0000001$ (or similarly small value) ensures no singularities.

Thus, the above correction is applied separately for each RGB "simplified spectral" channel. The result is effectively a value of n-factor that is corrected locally in device coordinate space for each RGB spectral channel.

The correction above is the third category of correction, namely parameter corrections that vary with device coordinate, and in general should be performed after the first two categories are optimized. However, it should be noted that with sufficient computing power, all the categories can be optimized together at the same time, or the different categories can be combined.

For example, one could optimize the parameters for category 1 followed by a combined optimization of categories 2 and 3 together. This latter approach was confirmed to work: however, the risk is that some of the parameters between the categories are somewhat correlated, resulting in ambiguous results for the parameters when categories are combined. Therefore, separating the optimization by categories 1, 2, and 3 is the preferred embodiment. It should also be noted that the optimization process for 1, 2, and 3 can be repeated multiple times in order to further refine and optimize the fit of the model to the measured data.

Figure 1:
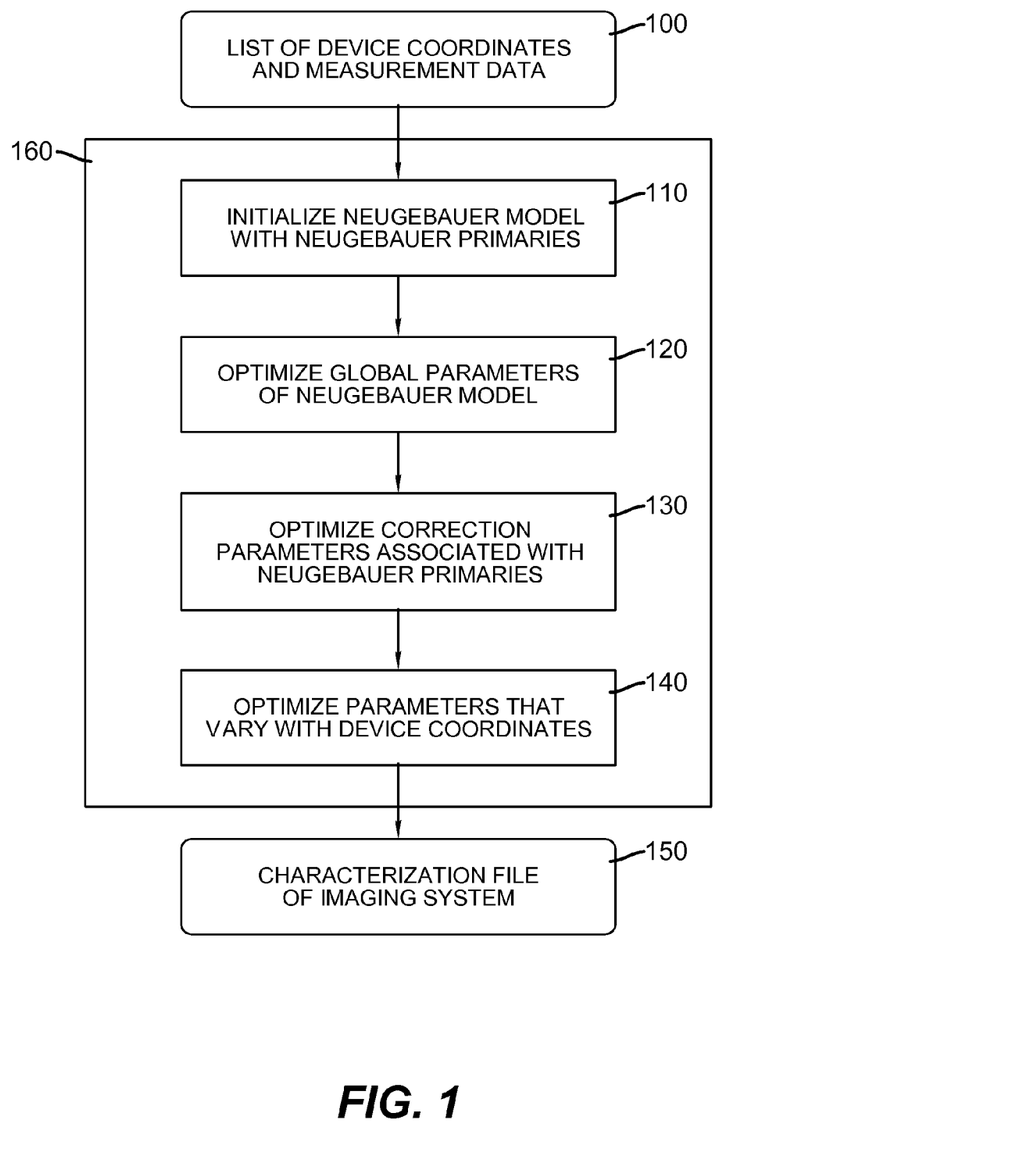
FIG. 1 shows the steps for optimizing the parameters that define the behavior of the "revised NeugX" model.

Referring now to FIG. 1, the high level steps for optimizing the NeugX model is shown. In step 100, the list of device coordinates and corresponding measured values of spectral data, XYZ, or L*a*b* are input into the NeugX profile builder 160. The output of the NeugX profile builder is a characterization file of the imaging system 150 that is being measured. This characterization file can be formatted in terms of a list of properties or can be created in the form of look-up tables that translate device coordinates into measured colorimetric data, typically either L*a*b* or XYZ. The most universal and useful format for device characterization is an ICC profile.

Referring now to the processes within the NeugX profile builder 160, in step 110 the processor initializes the NeugX model with the Neugebauer primaries. This involves determining the measured values of the spectrum $R_j$ ($N_s$, p) from Equation 1 above or determining values of RGB for each Neugebauer primary p which are converted from the XYZ data measured for each Neugebauer primary.

Next, in step 120 the NeugX builder optimizes the global parameters of the Neugebauer model relative to the list of device coordinates and measured data. As is well-known in the art, optimization involves calculating the error between model and data for a set of input device coordinates $x_1$, $x_2$, ..., $x_{Nm}$ and measurements $L*a*b*_1$, $L*a*b*_2$, ..., $L*a*b*_{Nm}$ beginning with default values for the global parameters and then varying the global parameters to achieve the lowest possible total error. Typical approaches use the method of least squares combined with error minimization methods such as Newton's method or Powell.

In step 130, a second optimization is performed using correction parameters associated with Neugebauer primaries. This second optimization pertains to the optimization of category 2 parameters as described above, such as the dot gain correction for each colorant s when printing on Neugebauer primary denoted by p ($\delta_{sp}$).

Finally in step 140 the NeugX builder optimizes the parameters that vary with device coordinates. This includes parameters such as $n'_j$ described above, which depends on all $N_s$ values of $x_s$ in device coordinate vector x.

Having sufficiently optimized the NeugX model, the NeugX builder creates a characterization file for the imaging system that is being measured. Files comprising of multiple formats can be written in order to serve different purposes. For example, the NeugX builder may create an ICC profile for immediate use in simulating the output of a printing press on an ink jet printer, or for converting RGB images to CMYK values of the printing press being characterized. Likewise, if a file containing an editable list of NeugX parameters is saved as well, sensitive values such as the min dot bump $\beta_s$ can be adjusted, the parameters can be used to re-initialize the NeugX model, and a modified ICC profile can be immediately re-created with no further optimization required.

Having developed a robust method for characterizing an imaging system such as a printing press with CMYK or more inks, the next question to ask is whether the number of measurements can be reduced in order to construct an accurate characterization of the imaging system. Conventional practice would indicate that for example, 1638 measurements are required to characterize offset printing such as SWOP. The IT8.7-4 chart is an example of a chart considered adequate to build an accurate characterization. However, if a chart comprised of comparable sampling is created for 7 inks versus 4, the size quickly because impossibly large to print or measure.

If the model described previously is a reasonably accurate method for characterizing an imaging system, relatively few measurement samples should be required. In particular, capturing data at various boundary conditions should suffice to define the model and predict measured colors that are not adjacent to a boundary condition.

The boundaries that were determined as adequate were areas in device coordinate space where colorants were either 0%, 100%, or of equal value x where 0%<x<100%. The chart required therefore would comprise of "NeugX Tint Ramps" where either 1, 2, or more colorants would be printed with equal tint values ranging from 0 to 100%. These NeugX Tint Ramps would be printed on paper and on all the combinations of Neugebauer primaries from the remaining inks not included in the NeugX Tint Ramp.

Having defined boundary locations, the next question is to determine the minimal sample size required at those locations in order to ensure the ability to build an accurate characterization. The general principle found to be effective was to reduce the number of samples with increasing number colorants in the NeugX Tint Ramp and with increasing number of colorants in the Neugebauer primary upon which the tint progression is printed.

Figure 2:
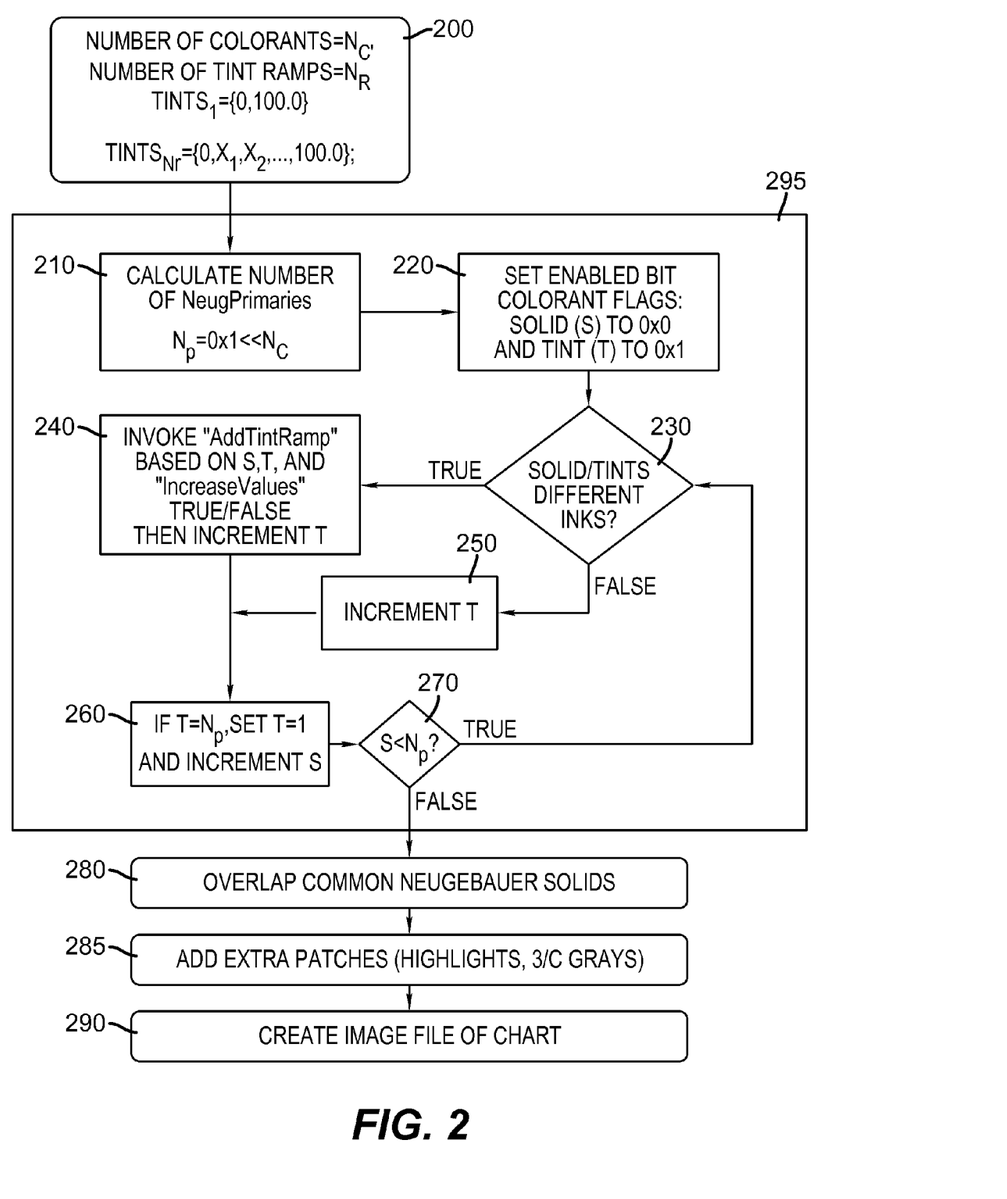
FIG. 2 shows the steps of the process for defining an optimized color chart that is sufficient for creating an accurate characterization file when the color data measured from that chart is processed according to the method of characterization described below.

Referring now to FIG. 2, the input data 200 to "NeugX Chart Builder" 295 includes the number of colorants $N_c$, the number of tint ramps or progressions $N_R$, followed by the $N_T$ lists or arrays of colorant values ranging from 0% to 100%.

In step 210 of FIG. 2, the number of Neugebauer primaries is calculated $$N_p = 0x1 << N_c$$ Eq. 15

The value $N_p$ is used to indicate the maximum number of enabled colorants in the form of enabled bit flags. Thus, the maximum enabled bits for CMYK would be binary value 1111=0xf(hex)=15 (decimal).

In step 220 the bit flags indicating solid colorants enabled in the Neugebauer primary S are initialized to 0x0 (indicating no inks enabled, i.e. paper) and tint colorants enabled in the progression T are initialized to 0x1 (indicating first ink enabled, since a progression must contain at least one ink).

In step 230 the NeugX Chart Builder confirms that for all bit flags set to 1 in T the corresponding bit flag is set to 0 in S and vice versa. This confirms that any colorant that is enabled in the tint progression is not enabled in the Neugebauer solid upon which the tint progression is printed, and vice versa. If any colorant has been enabled for both tint and solid, T is incremented 250 and step 240, the "AddTintRamp" command, is bypassed. If there is no overlap in enabled colorants between T and S, the NeugX Chart Builder proceeds to step 240 which invokes "AddTintRamp". The "AddTintRamp" procedure is shown in greater detail in FIG. 3.

Figure 3:
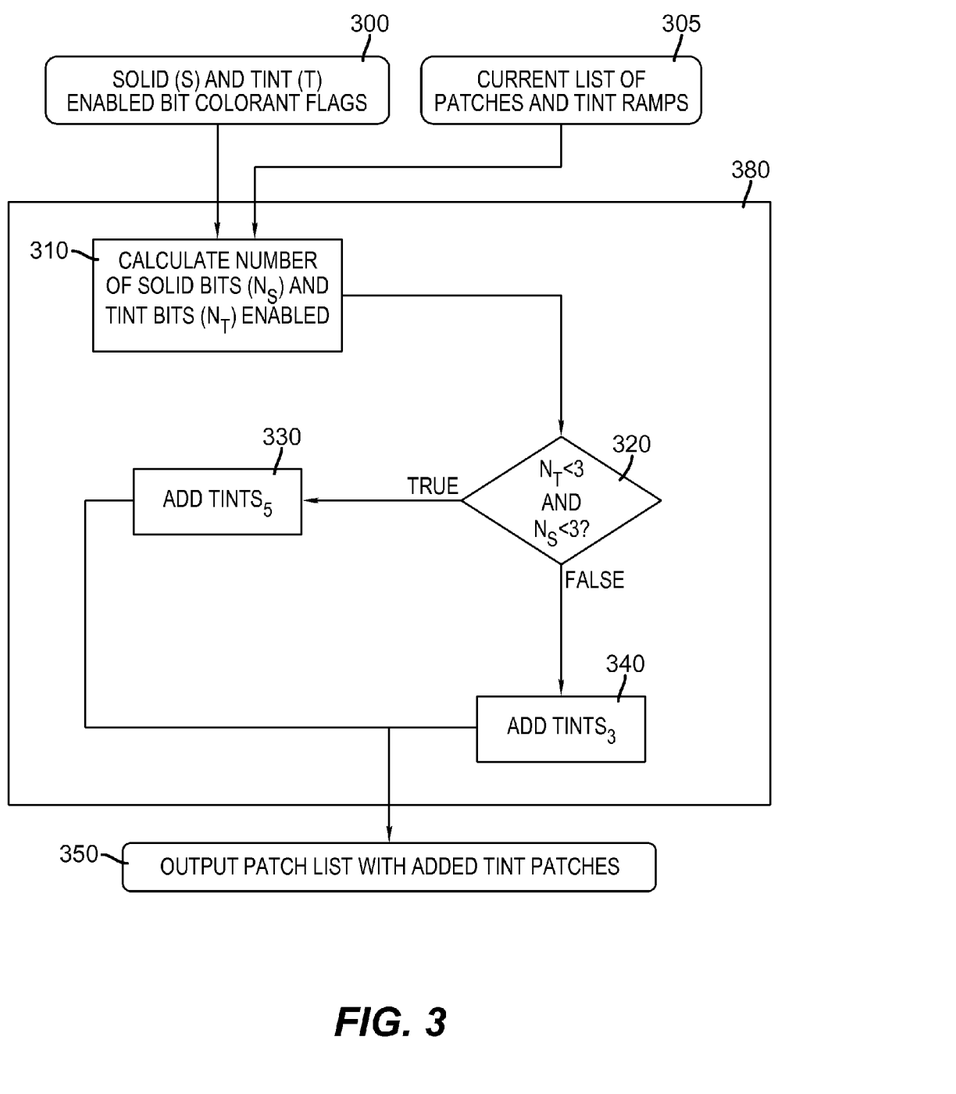
FIG. 3 shows a detailed description of step 240 "AddTintRamp" shown in FIG. 2 above.

Referring to FIG. 3, the solid and tint "colorants enabled" flags S and T are input to the "AddTintRamp" process (step 300), as well as the current list of patches that have been added thus far in the process and the list of tint ramps Tints$_1$, . . . , Tints$_{Nr}$ (step 305).

In step 310, the AddTintRamp processor calculates the number of solid colorants enabled in S ($N_s$) and the number of tint colorants enabled in T ($N_T$).

In step 320, the AddTintRamp processor determines whether both $N_s$ and $N_T$<3. If the step 320 result is true, AddTintRamp proceeds to step 330 and will add a tint progression Tints$_5$ of size 5 (0, 20%, 40%, 70%, 100%) from the list of tint progressions. The colorants that are given these values are determined from the enabled bits of the value of T. The colorants enabled by the bits comprising the value of S will be set to value 100%, thereby creating a particular Neugebauer primary.

If the result of step 320 is false, AddTintRamp will proceed to step 340 and add a tint progression Tints$_3$ of size 3 (0%, 40%, 100%) from the list of tint progressions similarly to step 330.

In step 350, the new patches are added to the existing list of patches and control returns to step 260 in the NeugXChartBuilder in FIG. 2. In step 260, if T=$N_p$, all combinations of colorant tints have been enabled, and therefore T is reset back to 0x1 and S (which indicates the solid colorant enabled flags) is incremented. Control now passes to step 270 which determines whether S<$N_p$. If the result of step 270 is true, control proceeds back to step 230 and the process is repeated. If the result of step 270 is false, the NeugXChartBuilder process is exited, and control passes to step 280.

Step 280 comprises of scanning all the list of colorant values and deleting redundant values. Optionally, the list can be sorted such that at the end of the first tint progression, the Neugebauer primary is identified. The list can subsequently be scanned for the next tint progression containing that Neugebauer primary. If the next tint progression begins with that Neugebauer primary, the progression can be attached to the first progression, and one of the overlapping Neugebauer primaries can be deleted. If the tint progression ends with the shared Neugebauer primary, the progression can be reversed, then attached to the previous progression, thereby allowing one of the overlapping primaries to be deleted.

This method of combining progressions that share a Neugebauer primary allows for a logical order and progression of colorants within the NeugX chart. This is helpful when trying to find regions of color that appear to have defects and large variability in the measured data, which is very common particularly for flexo printing.

After step 280 is complete, control passes to step 285 which adds extra patches that are helpful to the type of printing being performed. A detailed progression of 3/C gray is useful since gray balance is sensitive to the eye as well as highlight dot progressions in increments of 1/255 due to the sudden onset of highlight dot in flexo printing. Finally, in step 290 a chart image file is created which may be printed and measured according to the sequence of the list created in the above process.

Having developed a robust model for characterizing an imaging system, there exists a remaining obstacle to creating an accurate characterization, namely large errors in measurement data due to such issues as imperfect printing of dots or voids within a local area of one or more printing plates. These measurement errors in the data can be of the order of 30 or more $\Delta E$.

Figure 4:
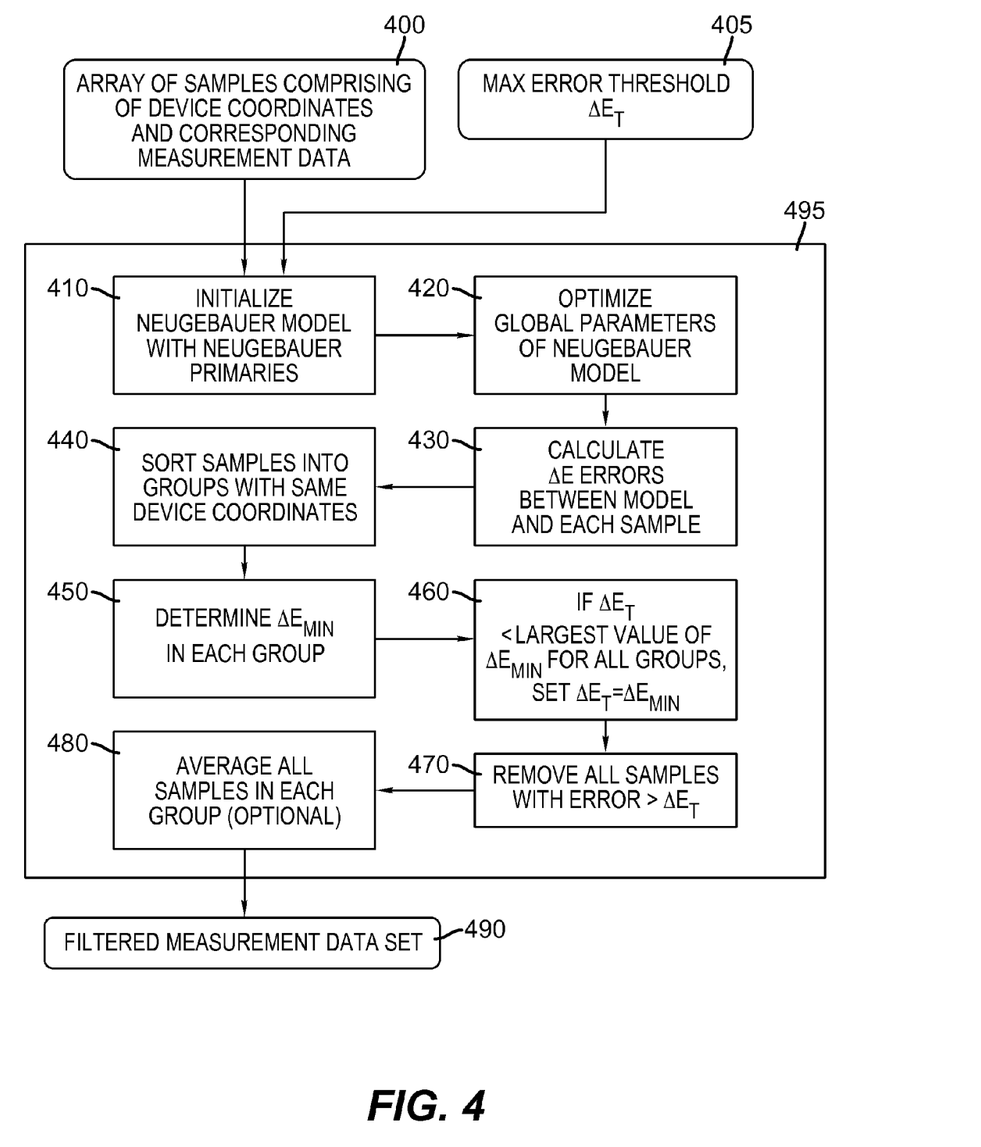
FIG. 4 shows the steps of the "SmartFilter" process which leverages the robust nature of the NeugX model to identify and eliminate spurious data points.

If the number of uncorrelated samples is >2 for a particular set of device coordinates, one can use various well-known methods such as mean-weighted averaging for minimizing the impact of erroneous data. However, such methods are not helpful if the number of samples is only 2. FIG. 4 describes the "SmartFilter" processor by which erroneous measurements can be eliminated for data measured from two charts at different locations on press sheet. It is assumed that the majority of samples within each chart have no redundancy and that the number of samples=2 for the majority of the data from the two charts.

In step 400 of FIG. 4 data comprising of an array of device coordinates and corresponding measurement data (for example L*a*b* or data from which L*a*b* can be calculated) is input to the SmartFilter processor 495. Likewise, an error threshold $\Delta E_T$ is input as well in step 405. The error threshold should be indicative of the maximum "reasonable" error expected for this particular data set. For example, a good estimate of $\Delta E_T$ would be 4, 5, or 6 sigma as determined from the differences in measurements between identical device coordinates in the two data sets.

In step 410, the data is used to initialize the Neugebauer model as described in step 110 previously. Similarly, the global parameters are optimized in step 420 similarly to step 120 described previously.

At this point, one will typically find that average errors between model and data are 2 to 3 times higher than the fully optimized model described in FIG. 1. However, since the number of parameters are much smaller than the number of data samples, the model characteristics are not significantly changed by bad data points as long as the number of bad data points is "reasonable", i.e. no more than a few percent of the total set of data.

In step 430, the SmartFilter processor calculates the $\Delta E$ error between the globally optimized model and each data point. In step 440, the data is sorted into groups that share the same device coordinates. Step 450, the lowest error $\Delta E_{min}$ is calculated for each group. At this point, one typically finds that in the vast majority of cases, the value of $\Delta E$ for at least one or more of the data points will be $<\Delta E_T$ and that therefore the value of $\Delta E_{min}<\Delta E_T$. However, if there exists errors that are somewhat larger than that which is expected by statistics or by other methods of estimation, it may occur that $\Delta E_{min}>\Delta E_T$, in which case the value of $\Delta E_T$ is set to $\Delta E_{min}$. This occurs in step 460. In step 470, all measurement data with $\Delta E>\Delta E_T$ is removed from the data set. For compactness of analysis and storage, all values sharing the same device coordinates can optionally be averaged in step 480. In step 490, the filtered data set is output for use by the NeugX model builder described in FIG. 1 for creating an accurate characterization file for the imaging system.

It is noted that even during data measurement difficulties can arise that prevent efficient capture of color data. For example, for a 7C data set (colorants CMYK, orange, green, and blue) the number of samples is 3152. At minimum, 2 charts should be measured, preferably 4 or more in order to ensure an accurate characterization of the imaging system. If the data is measured using a start/stop individual measurement process, the time to measure 4 charts would be over 3 hours. Since this is very expensive in terms of time and labor, it is preferable to measure data using scanning modes of the measurement device, for example using software applications such as ColorPort™ or MeasureTool™ sold by X-Rite incorporated. However, scanning modes often require patches that are easily readable, distinguishable, and which are within a tolerance of expected value. If one or more of the patches is flawed within a strip of patches being read by the software and device, the software capturing data from the device will return an error, and possibly suggest to the user to measure the chart using point by point measurement, which as indicated before may take several hours.

A solution to this problem is for the scanning software to read strips of patches contained within the chart in scanning mode wherever possible. In the event that there exists within one strip of patches a flawed patch, the software can automatically read that one strip on a point-by-point basis, then continue reading subsequent strips of patches contained in the chart using scanning mode. In this way, data is captured most efficiently, and can be subsequently filtered using the SmartFilter process described in FIG. 4.

Using the processes described in this application, the following results occurred:
1) Multiple charts including standard IT8.7-4 containing flawed data were read efficiently using scanning mode wherever possible and point-by-point mode on a per strip basis when necessary.
2) New (more efficient) charts were created using the NeugX chart builder and the color patches measured.
3) Erroneous data points with errors of 30 $\Delta E$ or more were intelligently removed using the SmartFilter process.
4) The revised NeugX model builder created ICC profiles for both CMYK as well as 7/C CMYK+OGB.
5) Comparisons of model accuracy between CMYK NeugX using 365 patches and CMYK cellular Neugebauer using 1638 patches resulted in only a slight increase in average error of prediction between training data and test data.
6) NeugX parameters such as min dot bump were adjusted to account for systematic and non-systematic errors in the training data used to build the model versus samples of solids and highlights in subsequent press runs.

The invention has been described in detail with particular reference to certain preferred embodiments thereof, but it will be understood that variations and modifications can be effected within the scope of the invention.

PARTS LIST 100 list of device coordinates and measurement data
110 initialize Neugebauer model with Neugebauer primaries
120 optimize global parameters of Neugebauer model
130 optimize correction parameters associated with Neugebauer primaries
140 optimize parameters that vary with device coordinates
150 characterization file of imaging system
160 NeugX profile builder
200 input data
210 calculate number of NeugPrimaries
220 set enabled bit colorant flags
230 NeugX Chart Builder confirms solid/tints different inks
240 NeugX Chart Builder invokes "AddTintRamp"
250 increment T
260 if $T=N_p$, set T=1 and increment S
270 determine whether $S<N_p$
280 overlap common Neugebauer solids
285 add extra patches
290 create image file of chart
295 NeugX Chart Builder
300 solid (S) and tint (T) enabled bit colorant flags
305 current list of patches and tint ramps
310 calculate number of solid bits ($N_s$) and tint bits ($N_T$) enabled
320 AddTintRamp processor determines whether both $N_s$ and $N_T<3$
330 AddTintRamp adds tint progression $Tints_5$
340 AddTintRamp adds tint progression $Tints_3$
350 output patch list with added tint patches
400 array of device coordinates and corresponding measurement data
405 error threshold $\Delta E_T$ input
410 initialize Neugebauer model with Neugebauer primaries
420 global parameters optimized
430 SmartFilter processor calculates $\Delta E$ error
440 data sorted into groups that share same device coordinates
450 lowest error $\Delta E_{min}$ is calculated for each group
460 value of $\Delta E_T$ set to $\Delta E_{min}$
470 measurement data with $\Delta E>\Delta E_T$ removed from data set
480 average all samples in each group
490 filtered measurement data set
495 data input to SmartFilter processor

The invention claimed is:
1. A method of designing a color chart having a plurality of colors patches comprising:

determining properties such as number of ink channels for an imaging device;

determining for each ink channel an ink progression;

determining a number of samples and values for each ink progression;

defining progressions of more than one ink wherein values of each ink in the progression are the same;

wherein all other inks not in the ink progressions are either zero or one hundred percent;

wherein the number of samples for progressions for one ink is greater than the number of samples of more than one ink; and wherein a number of samples decreases as the number of inks in the progression increases or as the number of inks of value one hundred percent increases.

2. The method of claim 1 wherein the ink progression is a range of dot areas ranging from zero to one hundred percent.

3. The method of claim 1 wherein progressions that share the same color for either an initial or final color are combined in order to eliminate the redundant color.

4. The method of claim 1 wherein an additional ink progression comprises three complementary inks.

5. The method of claim 4 wherein the three complementary inks are of equal value.

6. The method of claim 4 wherein the three complementary inks are different values to achieve neutrality.

7. The method of claim 1 comprising:

printing the color chart.

\* \* \* \* \*